(12) United States Patent
Ehlmann et al.

(10) Patent No.: US 12,549,028 B2
(45) Date of Patent: Feb. 10, 2026

(54) MICROINVERTER-INTEGRATED BATTERY PARALLELING DEVICES

(71) Applicant: Enphase Energy, Inc., Petaluma, CA (US)

(72) Inventors: Jonathan List Ehlmann, Austin, TX (US); Chris Morrow Young, Round Rock, TX (US)

(73) Assignee: Enphase Energy, Inc., Petaluma, CA (US)

( * ) Notice: Subject to any disclaimer, the term of this patent is extended or adjusted under 35 U.S.C. 154(b) by 0 days.

(21) Appl. No.: 18/914,613

(22) Filed: Oct. 14, 2024

(65) Prior Publication Data

US 2025/0141251 A1 May 1, 2025

Related U.S. Application Data

(60) Provisional application No. 63/546,127, filed on Oct. 27, 2023.

(51) Int. Cl.
*H02J 7/00* (2006.01)

(52) U.S. Cl.
CPC ........ *H02J 7/0063* (2013.01); *H02J 7/00036* (2020.01); *H02J 7/0024* (2013.01); *H02J 7/0048* (2020.01); *H02J 7/005* (2020.01); *H02J 2207/20* (2020.01)

(58) Field of Classification Search
CPC ........ H02J 7/0063; H02J 7/0048; H02J 7/005; H02J 7/00036; H02J 7/0024; H02J 2207/20
See application file for complete search history.

(56) References Cited

U.S. PATENT DOCUMENTS

2020/0244076 A1* 7/2020 Wang ................ H02M 7/53871

* cited by examiner

*Primary Examiner* — Carlos Amaya
(74) *Attorney, Agent, or Firm* — Moser Taboada

(57) ABSTRACT

An AC battery system is provided herein and comprises a plurality of microinverters, a first battery pack comprising a first plurality of battery cells and a second battery pack comprising a second plurality of battery cells. Each of the first plurality of battery cells and the second plurality of battery cells are connected to the plurality of microinverters via a first bus and a second bus comprising a respective first semiconductor switch and a second semiconductor switch, and a controller operatively connected to the plurality of microinverters and the first plurality of battery cells and the second plurality of battery cells and configured to control the plurality of microinverters to at least one of open or close the first semiconductor switch and the second semiconductor switch based on a voltage and an impedance of a first cell of the first plurality of battery cells and a first cell of the second plurality of battery cells.

20 Claims, 3 Drawing Sheets

MICROINVERTER-INTEGRATED BATTERY PARALLELING DEVICES

CROSS-REFERENCE OF RELATED APPLICATIONS

This present application claims the benefit of and priority to U.S. Provisional Application Ser. No. 63/546,127, filed on Oct. 27, 2023, the entire contents of which is incorporated herein by reference.

BACKGROUND

Field of the Disclosure

Embodiments of the present disclosure relate generally to power conversion systems, and for example, to microinverter-integrated battery paralleling devices.

Description of the Related Art

Power converters (microinverters) play an indispensable role in various electrical power applications, such as converting DC from renewable energy resources to power-grid compliant AC. In some applications the microinverter can be a component of a fully integrated AC battery system, which can comprise a battery pack (comprising one or more DC batteries or cells) and BMS (battery management system) with a battery controller. In some instances, the battery cells can be configured in multiple ways to meet an ideal voltage for the microinverter. For example, the battery cells can be arranged in a 2s2p (2 series 2 parallel) configuration. The battery cells can be assembled in the field, but the battery cells individual SoC (state-of-charge) is, typically, not known. If there is a large difference in voltage between the battery cells, however, high inrush currents during paralleling of the battery cells can damage the battery or the rest of the AC battery system. For example, one battery cell can be fully charged at about 57.6 V and another battery cell can be fully discharged at 32 V, both battery cells with an internal resistance of 10 mΩ. Thus, an instantaneous inrush current would be $(57.6-32)/(20e-3)=1280$ A, which is too high and, more likely than not, will damage the AC battery system, not to mention cause serious injury to an installer.

Therefore, there is a need for improved microinverter-integrated battery paralleling devices.

SUMMARY

In accordance with at least some aspects of the disclosure, there is provided an AC battery system comprising a plurality of microinverters, a first battery pack comprising a first plurality of battery cells and a second battery pack comprising a second plurality of battery cells. Each of the first plurality of battery cells and the second plurality of battery cells are connected to the plurality of microinverters via a first bus and a second bus comprising a respective first semiconductor switch and a second semiconductor switch. A controller operatively connected to the plurality of microinverters and the first plurality of battery cells and the second plurality of battery cells can be configured to control the plurality of microinverters to at least one of open or close the first semiconductor switch and the second semiconductor switch based on a voltage and an impedance of a first cell of the first plurality of battery cells and a first cell of the second plurality of battery cells.

In accordance with at least some aspects of the disclosure, there is provided a method for connecting or disconnecting one or more battery cells to one or more microinverters in a battery pack. The method can comprise controlling the plurality of microinverters to at least one of open or close a first semiconductor switch and a second semiconductor switch connected to the plurality of microinverters via a first bus and a second bus based on a voltage and an impedance of a first cell of a first plurality of battery cells and a first cell of the second plurality of battery cells of a first battery pack and a second battery pack, respectively.

In accordance with at least some aspects of the disclosure, there is provided a non-transitory computer readable storage medium having instructions stored thereon that when executed by a processor perform a method for connecting or disconnecting one or more battery cells to one or more microinverters in a battery pack. The method comprises controlling the plurality of microinverters to at least one of open or close a first semiconductor switch and a second semiconductor switch connected to the plurality of microinverters via a first bus and a second bus based on a voltage and an impedance of a first cell of a first plurality of battery cells and a first cell of the second plurality of battery cells of a first battery pack and a second battery pack, respectively.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

Methods and apparatus described herein provide improved microinverter-integrated battery paralleling devices. For example, an AC battery system can comprise a plurality of microinverters, a first battery pack comprising a first plurality of battery cells and a second battery pack comprising a second plurality of battery cells. Each of the first plurality of battery cells and the second plurality of battery cells connected to the plurality of microinverters via a first bus and a second bus comprising a respective first semiconductor switch and a second semiconductor switch. A controller operatively connected to the plurality of microinverters and the first plurality of battery cells and the second plurality of battery cells is configured to control the plurality of microinverters to at least one of open or close the first semiconductor switch and the second semiconductor switch based on a voltage and an impedance of a first cell of the first plurality of battery cells and a first cell of the second plurality of battery cells. The methods and apparatus described herein reduce, if not eliminate, an instantaneous inrush current during paralleling of one or more battery cells, which can protect the AC battery system and components associated therewith from damage and prevent serious injury to an installer.

Figure 1:
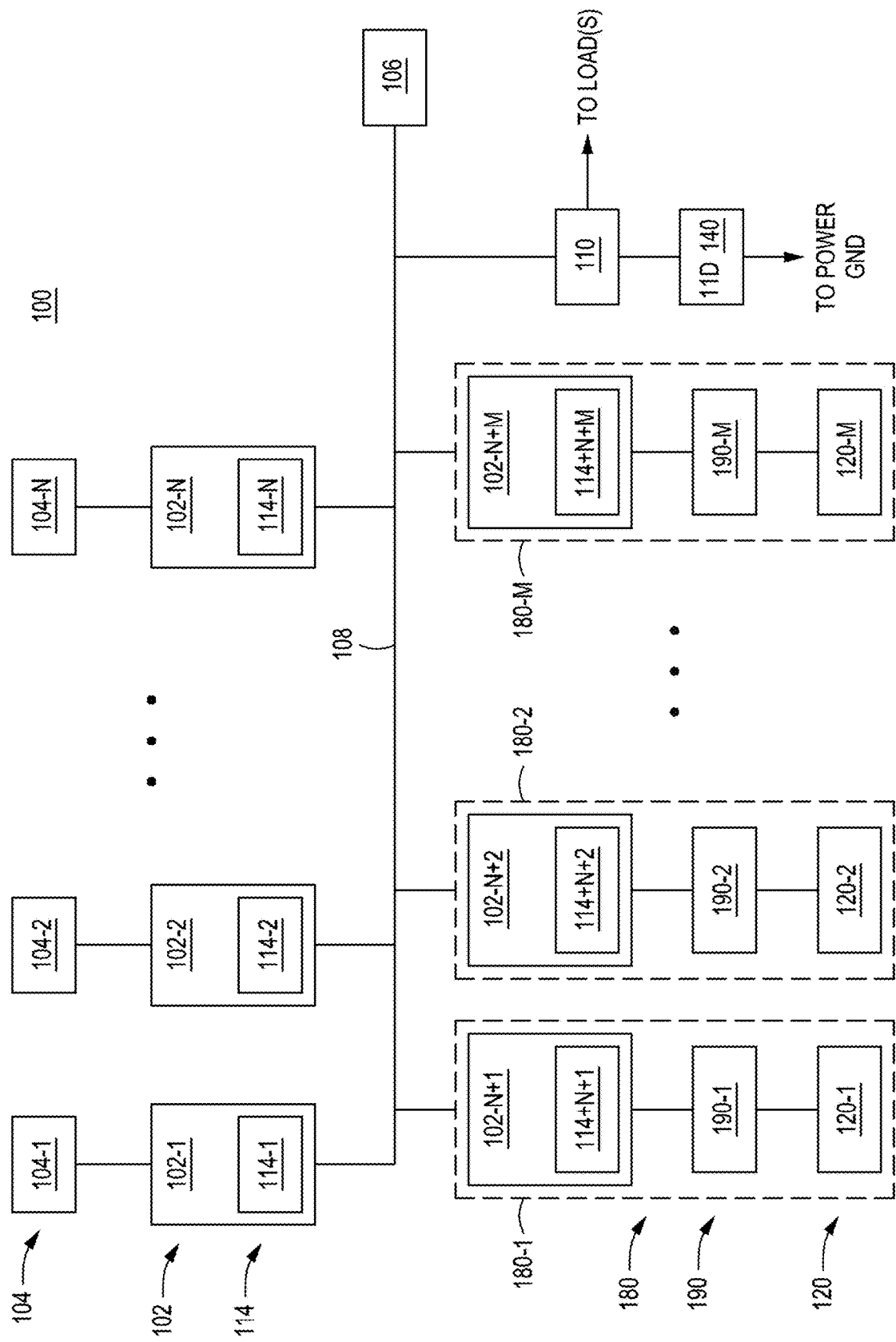
FIG. 1 is a block diagram of an energy management system, in accordance with one or more embodiments of the present disclosure.

FIG. 1 is a block diagram of a system 100 (an energy management system) for power conversion using one or more embodiments of the present disclosure. This diagram only portrays one variation of the myriad of possible system configurations and devices that may utilize the present disclosure.

The system 100 is a microgrid that can operate in both an islanded state (off-grid state) and in a grid-connected state (i.e., when connected to another power grid (such as one or more other microgrids and/or a commercial power grid). The system 100 comprises a plurality of power converters 102-1, 102-2, . . . 102-N, 102-N+1, and 102-N+M collectively referred to as power converters 102 (which also may be called power conditioner units (PCU)); a plurality of DC power sources 104-1, 104-2, . . . 104-N, collectively referred to as DC power sources 104 (e.g., resources); a plurality of energy storage devices/delivery devices 120-1, 120-2, . . . 120-M collectively referred to as energy storage/delivery devices 120; a system controller 106; a plurality of BMUs 190-1, 190-2, . . . 190-M (battery management units) collectively referred to as BMUs 190; a system controller 106; a bus 108; a load center 110; and an IID 140 (island interconnect device) (which may also be referred to as a microgrid interconnect device (MID)). In some embodiments, the energy storage/delivery devices are rechargeable batteries (e.g., multi-C-rate collection of AC batteries) which may be referred to as batteries 120, although in other embodiments the energy storage/delivery devices may be any other suitable device for storing energy and providing the stored energy. Generally, each of the batteries 120 comprises a plurality cells that are coupled in series, e.g., eight cells coupled in series to form a battery.

Each power converter 102-1, 102-2 . . . 102-N is coupled to a DC power source 104-1, 104-2 . . . 104-N, respectively, in a one-to-one correspondence, although in some other embodiments multiple DC power sources may be coupled to one or more of the power converters 102. The power converters 102-N+1, 102-N+2 . . . 102-N+M are respectively coupled to plurality of energy storage devices/delivery devices 120-1, 120-2 . . . 120-M via BMUs 190-1, 190-2 . . . 190-M to form AC batteries 180-1, 180-2 . . . 180-M, respectively. Each of the power converters 102-1, 102-2 . . . 102-N+M comprises a controller 114-1, 114-2 . . . 114-N+M (collectively referred to as the inverter controllers 114) for controlling operation of the power converters 102-1, 102-2 . . . 102-N+M.

In some embodiments, such as the embodiment described below, the DC power sources 104 are DC power sources and the power converters 102 are bidirectional inverters such that the power converters 102-1 . . . 102-N convert DC power from the DC power sources 104 to grid-compliant AC power that is coupled to the bus 108, and the power converters 102-N+1 . . . 102-N+M convert (during energy storage device discharge) DC power from the batteries 120 to grid-compliant AC power that is coupled to the bus 108 and also convert (during energy storage device charging) AC power from the bus 108 to DC output that is stored in the batteries 120 for subsequent use. The DC power sources 104 may be any suitable DC source, such as an output from a previous power conversion stage, a battery, an EV, an EVSE, a renewable energy source (e.g., a solar panel or photovoltaic (PV) module (solar cells), a wind turbine, a hydroelectric system, or similar renewable energy source), or the like, for providing DC power. In other embodiments the power converters 102 may be other types of converters (such as DC-DC converters), and the bus 108 is a DC power bus.

The power converters 102 are coupled to the system controller 106 via the bus 108 (which also may be referred to as an AC line or a grid). The system controller 106 generally comprises a CPU coupled to each of support circuits and a memory that comprises a system control module for controlling some operational aspects of the system 100 and/or monitoring the system 100 (e.g., issuing certain command and control instructions to one or more of the power converters 102, collecting data related to the performance of the power converters 102, and the like). The system controller 106 is capable of communicating with the power converters 102 by wireless and/or wired communication (e.g., power line communication) for providing certain operative control and/or monitoring of the power converters 102.

In some embodiments, the system controller 106 may be a gateway that receives data (e.g., performance data, MTTP data, etc.) from the power converters 102 and communicates (e.g., via the Internet) the data and/or other information to a remote device or system, such as a master controller (not shown). Additionally (or alternatively), the gateway may receive information from a remote device or system (not shown) and may communicate the information to the power converters 102 and/or use the information to generate control commands that are issued to the power converters 102.

The power converters 102 are coupled to the load center 110 via the bus 108, and the load center 110 is coupled to the power grid via the IID 140. When coupled to the power grid (e.g., a commercial grid or a larger microgrid) via the IID 140, the system 100 may be referred to as grid-connected; when disconnected from the power grid via the IID 140, the system 100 may be referred to as islanded. The IID 140 determines when to disconnect from/connect to the power grid (e.g., the IID 140 may detect a grid fluctuation, disturbance, outage or the like) and performs the disconnection/connection. Once disconnected from the power grid (off-grid), the system 100 can continue to generate power as an intentional island, without imposing safety risks on any line workers that may be working on the grid, using one or more conventional droop control techniques. The IID 140 comprises a disconnect component (e.g., a disconnect relay) for physically disconnecting/connecting the system 100 from/to the power grid. In some embodiments, the IID 140 may additionally comprise an autoformer for coupling the system 100 to a split-phase load that may have a misbalance in it with some neutral current. In certain embodiments, the system controller 106 comprises the IID 140 or a portion of the IID 140.

The power converters 102 convert the DC power from the DC power sources 104, discharge the batteries 120 to grid-compliant AC power, and couple the generated output power to the load center 110 via the bus 108. The power is then distributed to one or more loads (for example to one or more appliances) and/or to the power grid (when connected to the power grid). Additionally (or alternatively), the generated energy may be stored for later use, for example using batteries, heated water, hydro pumping, $H_2O$-to-hydrogen conversion, or the like. Generally, the system 100 is coupled to the commercial power grid, although in some embodiments the system 100 is completely separate from the commercial grid and operates as an independent microgrid.

In some embodiments, the AC power generated by the power converters 102 is single-phase AC power. In other embodiments, the power converters 102 generate three-phase AC power.

Figure 2:
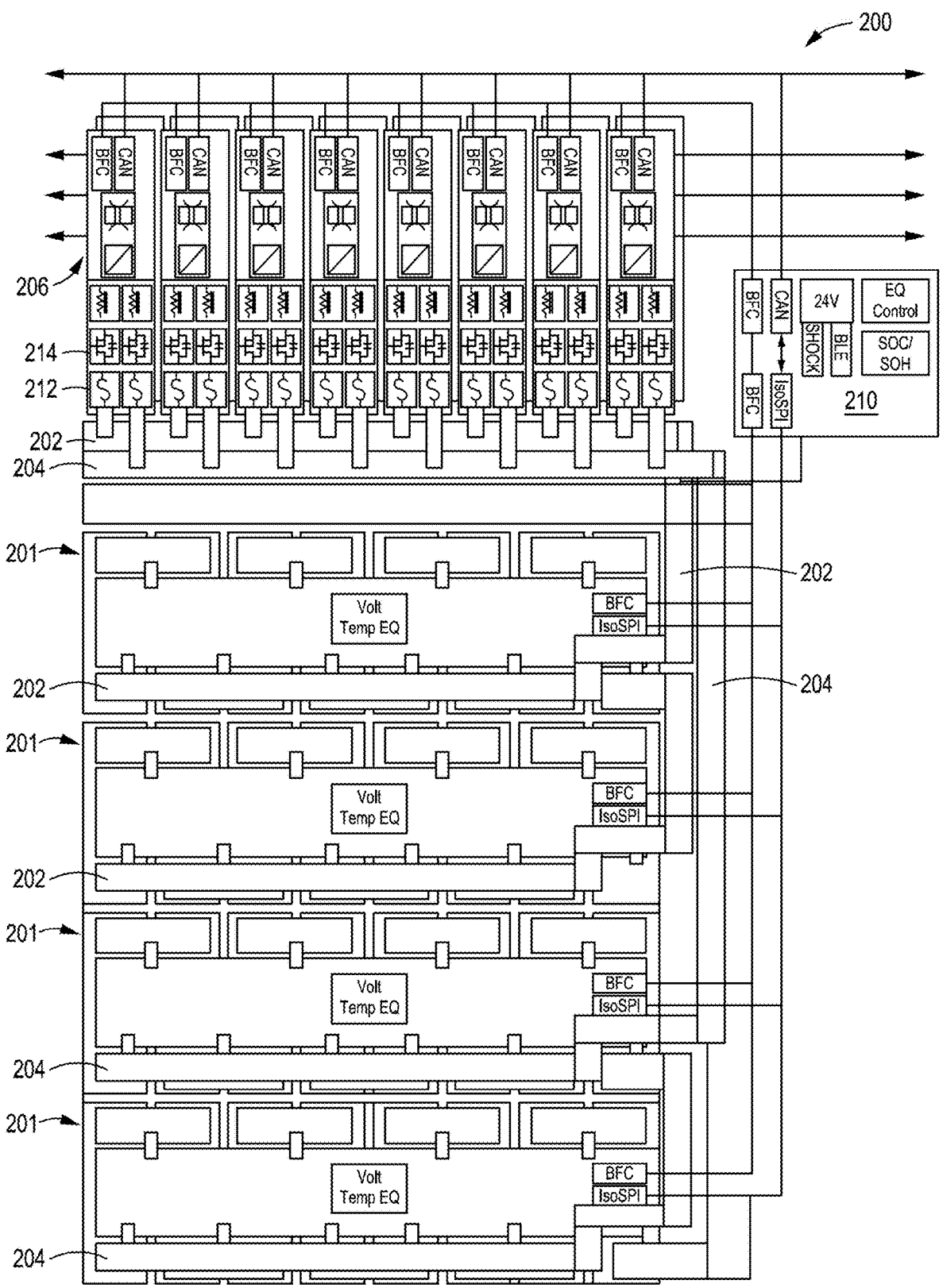
FIG. 2 is a block diagram of an AC battery system configured for use with the energy management system of FIG. 1, in accordance with one or more embodiments of the present disclosure.
Figure 3:
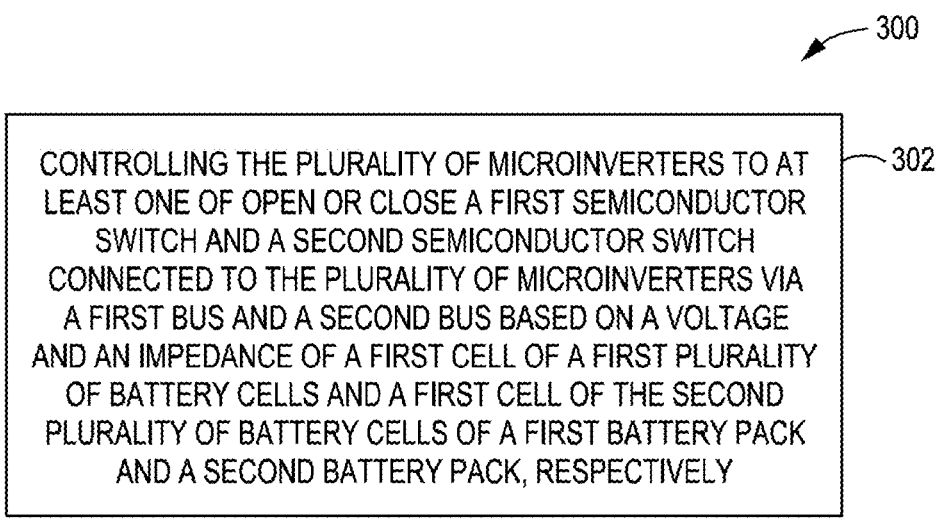
FIG. 3 is a flowchart of a method for connecting or disconnecting one or more battery cells to one or more microinverters in a battery pack, in accordance with one or more embodiments of the present disclosure.

FIG. 2 is a block diagram of an AC battery system 200 configured for use with the system 100 of FIG. 1, and FIG. 3 is a flowchart of method 300 for connecting or disconnecting one or more battery cells to one or more microinverters in a battery pack, in accordance with one or more embodiments of the present disclosure. For example, at 302, the method 300 can comprise controlling the plurality of microinverters to at least one of open or close a first semiconductor switch and a second semiconductor switch connected to the plurality of microinverters via a first bus and a second bus based on a voltage and an impedance of a first cell of a first plurality of battery cells and a first cell of the second plurality of battery cells of a first battery pack and a second battery pack, respectively. For illustrative purposes, the AC battery system 200 is shown comprising one set of battery cells 201 (e.g., 2s1p-2 battery cells in series and 1 battery cell not yet paralleled) for each bus (e.g., a bus 202 (yellow bus bar) and a bus 204 (red bus bar).

A plurality of microinverters 206 are connected to the bus 202 and the bus 204. For example, in the illustrated embodiments, eight (8) microinverters are each connected to the bus 202 and the bus 204. A controller (e.g., a BMS 210) is connected between the plurality of microinverters 206 and battery cells 201. The controller is configured to monitor/determine aspects of the plurality of microinverters 206 and/or the battery cells 201. For example, in at least some embodiments, the controller can monitor/determine (monitoring/determining) state-of-health (SoH), SoC of the battery cells 201 using a BFC (battery fuel cell) connection that also connects to the plurality of microinverters 206. Additionally, other information relating to the battery/battery cells can be transmitted from the battery via an Iso SPI (isolated serial peripheral interface) connection to the controller which is then transmitted via a CAN (control area network) of the controller to the plurality of microinverters 206 and/or other components (e.g., the system controller 106) of the system 100.

The bus 202 and the bus 204 each comprise a fuse 212 and semiconductor switch 214 that is configured to provide discharge overcurrent protection and to connect and disconnect the battery cells 201 from the plurality of microinverters 206. Thus, in operation a microinverter (or set of microinverters) of the plurality of microinverters 206 can connect to and discharge or charge either set of the battery cells 201. For example, the plurality of microinverters 206 can equalize a voltage (equalizing a voltage)) between the battery cells 201, close both switches to parallel the modules, then charge/discharge (charging/discharging) from both of the battery cells 201 (e.g., both battery packs) simultaneously. For example, assuming a first battery cell of a first battery pack is at 55.0 V and a second battery cell of a second battery pack is at 55.1 V, both with an internal resistance of 10 mΩ, an instantaneous inrush current can be calculated via the controller, e.g., $(55.1-55.0)/(20e-3)=5$ A, which can be easily handled by the plurality of microinverter 206 and/or the battery hardware. Additionally, by measuring both currents, if there is a large difference between the currents of the first and second battery packs, under control of the controller the plurality of microinverters 206 can detach the paralleled modules, e.g., using the semiconductor switch 214. For example, as noted above, if one battery cell is fully charged at about 57.6 V and another battery cell is fully discharged at 32 V, both battery cells with an internal resistance of 10 mΩ, a calculated instantaneous inrush current would be $(57.6-32)/(20e-3)=1280$ A, which is unacceptable. In such an instance, the controller can control the plurality of microinverters 206 to open the semiconductor switch 214 to detach the paralleled battery cells so that the detached battery cells can be equalized, subsequently paralleled, and charged and discharged as needed. The fuse 212 operates in a conventional manner and can be rated based on user/manufacturer preference.

Additionally, the controller is configured to attach the plurality of microinverters 206 to the higher voltage bus to discharge the higher voltage bus. Thus, if the power demand exceeds the current capacity of one of the battery packs, the controller (converter) will attach some of the microinverters of the plurality of microinverters 206 to the lower voltage pack so more power would be drawn from the higher voltage pack, i.e., minimizing the voltage difference while constrained by the power demand. Similarly, when the difference in battery pack voltage is low enough, the controller is configured to command some of the microinverters of the plurality of microinverters 206 to attach to both battery packs. In at least some embodiments, the battery pack voltage can be determined to be low enough by calculating the expected inrush current (e.g., using the above equations). For example, the controller can be configured to measure the battery pack voltage and divide the battery pack voltage by the battery pack impedance. As the battery pack impedance (e.g., the impedance of conductors) may change with temperature and the impedance of the battery cells may change with both temperature and SoC and/or SoH, the battery pack impedance can be calculated on the fly (e.g., relatively quickly). In at least some embodiments, the controller can be configured to calculate the expected current with margin such that the battery pack voltage can be known a priori.

Moreover, if there is an issue with a battery pack, the controller can be configured to command (or each of the plurality of microinverters 206 can be configured to independently decide) to detach the battery pack from the plurality of microinverters 206. In at least some embodiments, the issues with the battery pack can include, but are not limited to, over/under-current, voltage, temperature of the battery cells or the battery packs; while attached, however, the battery packs will be at the same voltage, volatile organic compounds (VoC, chemical fumes) detection, shock and vibration, external flood, fire, earthquake alerts, etc.

The microinverters of the plurality of microinverters 206 can be configured to measure individual currents of the battery packs. For example, when separate currents are measured, the microinverters of the plurality of microinverters 206 can be configured to calculate separate SoCs. In at least some embodiments, a constrained optimization (e.g., the power demand) algorithm can be used by the controller/microinverters to change the number of microinverters attached to each bus (or both buses) to change currents to balance SoCs between battery packs. In such embodiments, both battery packs can be loaded equally so that the 100% power command can be achieved. In the instance when the microinverters are attached to both buses and need to be re-attach to both buses, as described above, the higher voltage bus would have to be discharged again and the voltages equalized.

Further, microinverters of the plurality of microinverters 206 attached to bus A can discharge bus A, while microinverters of the plurality of microinverters 206 attached to bus B can charge, and vice-versa. Microinverters of the plurality of microinverters 206 can exchange power through the AC connection with or without exchanging net power with the rest of the AC grid (would be constrained by power). The microinverters of the plurality of microinverters 206 are not configured to both exchange power while exchanging 100% rated current with the grid.

While the foregoing is directed to embodiments of the present disclosure, other and further embodiments of the disclosure may be devised without departing from the basic scope thereof.

What is claimed is:

1. An AC battery system, comprising:
    a plurality of microinverters;
    a first battery pack comprising a first plurality of battery cells and a second battery pack comprising a second plurality of battery cells, each of the first plurality of battery cells and the second plurality of battery cells connected to the plurality of microinverters via a first bus and a second bus comprising a respective first semiconductor switch and a second semiconductor switch; and
    a controller operatively connected to the plurality of microinverters and the first plurality of battery cells and the second plurality of battery cells and configured to control the plurality of microinverters to at least one of open or close the first semiconductor switch and the second semiconductor switch based on a voltage and an impedance of a first cell of the first plurality of battery cells and a first cell of the second plurality of battery cells.

2. The AC battery system of claim 1, wherein each of the first plurality of battery cells and the second plurality of battery cells comprises one set of battery cells having two (2) battery cells in series and one (1) battery cell for each of the first bus and the second bus.

3. The AC battery system of claim 1, wherein the plurality of microinverters comprises eight (8) microinverters each connected to the first bus and the second bus.

4. The AC battery system of claim 1, wherein the controller is configured to monitor/determine at least one of state-of-health (SoH) or state-of-charge (SoC) of the first plurality of battery cells and the second plurality of battery cells using a battery cell connection that also connects to the plurality of microinverters.

5. The AC battery system of claim 1, wherein information relating to the first battery pack, the first plurality of battery cells, the second battery pack, or the second plurality of battery cells is transmitted from the first battery pack or the second battery pack via an isolated serial peripheral interface (Iso SPI) connection to the controller which is configured to transmit via a control area network (CAN) the information relating to the first battery pack, the first plurality of battery cells, the second battery pack, or the second plurality of battery cells to the plurality of microinverters.

6. The AC battery system of claim 1, wherein the plurality of microinverters are configured to equalize a voltage between the first plurality of battery cells and the second plurality of battery cells, close the first semiconductor switch and the second semiconductor switch to parallel the first plurality of battery cells and the second plurality of battery cells, then charge/discharge from both of the first plurality of battery cells and the second plurality of battery cells simultaneously.

7. The AC battery system of claim 1, wherein, when a power demand exceeds a current capacity of the first battery pack or the second battery pack, the controller is further configured to attach the plurality of microinverters to a higher voltage bus to discharge the higher voltage bus and to attach some of the microinverters of the plurality of microinverters to a lower voltage pack so more power is drawn from the higher voltage pack.

8. A method for connecting or disconnecting battery cells to/from a plurality of microinverters in a battery pack, comprising:
    controlling the plurality of microinverters to at least one of open or close a first semiconductor switch and a second semiconductor switch connected to the plurality of microinverters via a first bus and a second bus based on a voltage and an impedance of a first cell of a first plurality of battery cells and a first cell of a second plurality of battery cells of a first battery pack and a second battery pack, respectively.

9. The method of claim 8, wherein each of the first plurality of battery cells and the second plurality of battery cells comprises one set of battery cells having two (2) battery cells in series and one (1) battery cell for each of the first bus and the second bus.

10. The method of claim 8, wherein the plurality of microinverters comprises eight (8) microinverters each connected to the first bus and the second bus.

11. The method of claim 8, further comprising monitoring/determining at least one of state-of-health (SoH) or state-of-charge (SoC) of the first plurality of battery cells and the second plurality of battery cells using a battery cell connection that also connects to the plurality of microinverters.

12. The method of claim 8, further comprising:
    transmitting from the first battery pack or the second battery pack via an isolated serial peripheral interface (Iso SPI) connection information relating to the first battery pack, the first plurality of battery cells, the second battery pack, or the second plurality of battery cells to a controller; and
    transmitting from the controller via a control area network (CAN) information relating to the first battery pack, the first plurality of battery cells, the second battery pack, or the second plurality of battery cells to the plurality of microinverters.

13. The method of claim 8, further comprising:
    equalizing a voltage between the first plurality of battery cells and the second plurality of battery cells;
    closing the first semiconductor switch and the second semiconductor switch to parallel the first plurality of battery cells and the second plurality of battery cells; and
    charging/discharging from both of the first plurality of battery cells and the second plurality of battery cells simultaneously.

14. The method of claim 8, further comprising, when a power demand exceeds a current capacity of the first battery pack or the second battery pack, attaching the plurality of microinverters to a higher voltage bus to discharge the higher voltage bus and attaching some of the microinverters of the plurality of microinverters to a lower voltage pack so more power is drawn from the higher voltage pack.

15. A non-transitory computer readable storage medium having instructions stored thereon that when executed by a processor performs a method of method for connecting or disconnecting one or more battery cells to a plurality of microinverters in a battery pack, comprising:

controlling the plurality of microinverters to at least one of open or close a first semiconductor switch and a second semiconductor switch connected to the plurality of microinverters via a first bus and a second bus based on a voltage and an impedance of a first cell of a first plurality of battery cells and a first cell of a second plurality of battery cells of a first battery pack and a second battery pack, respectively.

16. The non-transitory computer readable storage medium of claim 15, wherein each of the first plurality of battery cells and the second plurality of battery cells comprises one set of battery cells having two (2) battery cells in series and one (1) battery cell for each of the first bus and the second bus.

17. The non-transitory computer readable storage medium of claim 15, wherein the plurality of microinverters comprises eight (8) microinverters each connected to the first bus and the second bus.

18. The non-transitory computer readable storage medium of claim 15, further comprising monitoring/determining at least one of state-of-health (SoH) or state-of-charge (SoC) of the first plurality of battery cells and the second plurality of battery cells using a battery cell connection that also connects to the plurality of microinverters.

19. The non-transitory computer readable storage medium of claim 15, further comprising:
    transmitting from the first battery pack or the second battery pack via an isolated serial peripheral interface (Iso SPI) connection information relating to the first battery pack, the first plurality of battery cells, the second battery pack, or the second plurality of battery cells to a controller; and
    transmitting from the controller via a control area network (CAN) information relating to the first battery pack, the first plurality of battery cells, the second battery pack, or the second plurality of battery cells to the plurality of microinverters.

20. The non-transitory computer readable storage medium of claim 15, further comprising:
    equalizing a voltage between the first plurality of battery cells and the second plurality of battery cells;
    closing the first semiconductor switch and the second semiconductor switch to parallel the first plurality of battery cells and the second plurality of battery cells; and
    charging/discharging from both of the first plurality of battery cells and the second plurality of battery cells simultaneously.

* * * * *